No. 802,438. PATENTED OCT. 24, 1905.
R. E. WHITE & H. HALL.
TONGS.
APPLICATION FILED MAR. 27, 1905.
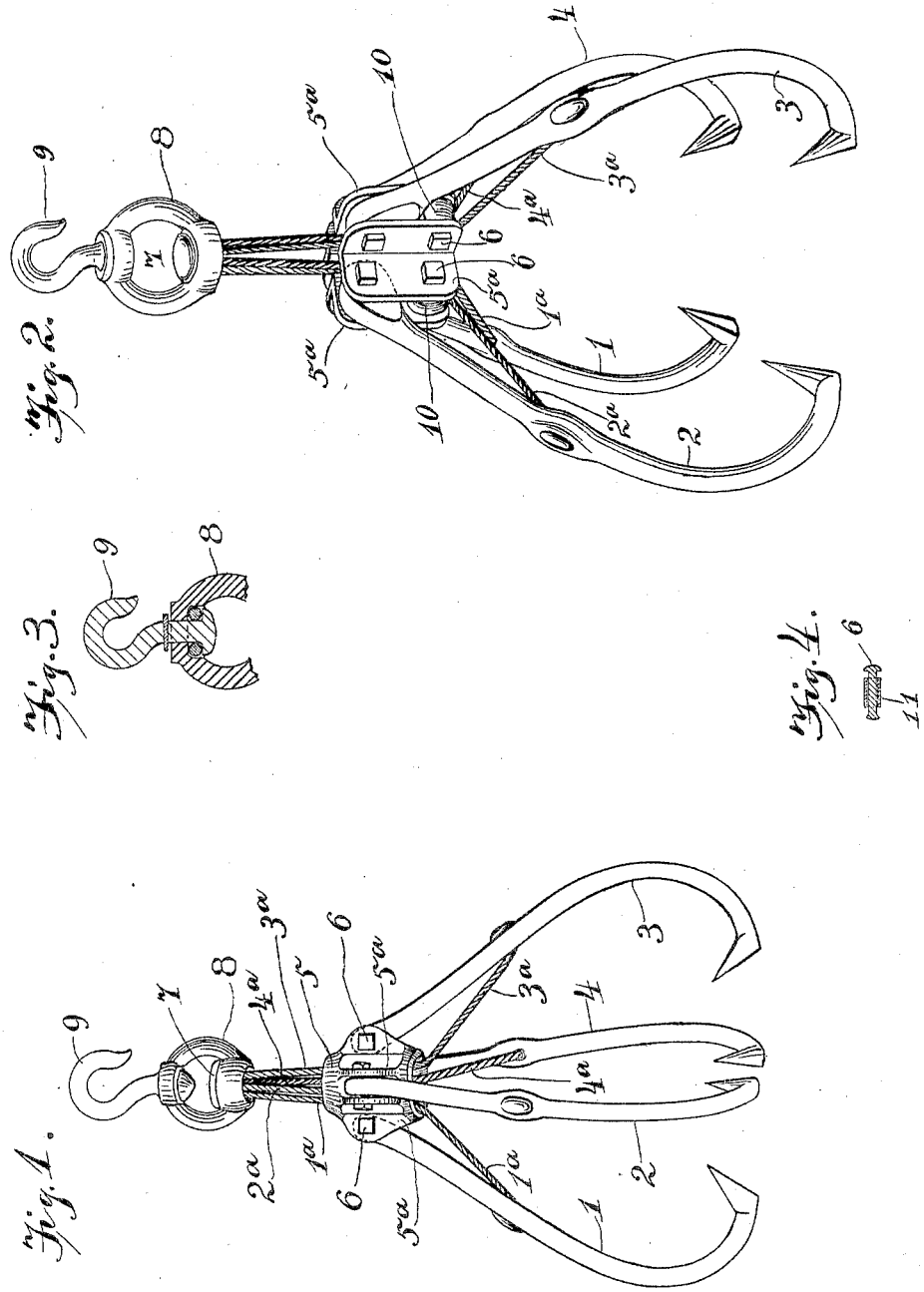
WITNESSES:
Willington M. Blewett
Pearl Martin
INVENTORS
Robert E. White
Harry Hall
BY James T. Watson
ATTORNEY.

UNITED STATES PATENT OFFICE.

ROBERT E. WHITE, OF DULUTH, MINNESOTA, AND HARRY HALL, OF MANTON, MICHIGAN.

TONGS.

No. 802,438. Specification of Letters Patent. Patented Oct. 24, 1905.

Application filed March 27, 1905. Serial No. 252,122.

*To all whom it may concern:*

Be it known that we, ROBERT E. WHITE, residing at Duluth, Minnesota, and HARRY HALL, residing at Manton, in the county of Wexford and State of Michigan, citizens of the United States, have invented certain new and useful Improvements in Tongs; and we do hereby declare the following to be a full, clear, and exact description of the invention, such as will enable others skilled in the art to which it appertains to make and use the same.

Our invention relates to tongs adapted for skidding logs, pulling stumps, or various other purposes.

It has for its object the provision of a compact, simple, durable, and powerful construction for such purposes, which may be quickly attached and detached from its load and which may be dragged when loaded without great danger of becoming caught by or entangled in natural obstacles on the ground.

In the accompanying drawings, Figure 1 is an elevation of our said invention. Fig. 2 is an elevation of a modified form thereof. Fig. 3 is a central vertical sectional detail of a portion of a modified form of swivel, and Fig. 4 is a central vertical longitudinal sectional detail of a modified form of hook-pivot or axle for antifriction-roller.

Referring to said drawings, any suitable number of hooks, as 1, 2, 3, and 4, are arranged around a central hub 5, provided with a suitable number of flanges, as $5^a$, to which the shanks of said hooks are pivoted in any suitable manner, as by bolts 6. To said hooks, respectively, intermediate of their ends are secured corresponding chains or cables, as $1^a$, $2^a$, $3^a$, and $4^a$, which cables are directed upwardly through a central passage formed in said hub, and are secured at their opposite ends in any suitable manner or by any suitable means to a head 7, supported by any suitable hauling means or swivel device, as by a swivel comprising the link 8 and the hook 9. Said cables are adapted to run freely through the central passage of the hub and are of sufficient length to permit of said hooks being drawn apart from each other at their lower ends to receive their load. In Fig. 1 said hub is shown as an integral casting. In the modified form shown in Fig. 2 said hub is made up of rolled angle-irons bolted together by the pivot-bolts of said hooks and by similar bolts forming the axles of antifriction-rollers 10, mounted on said hub. In the construction shown in Fig. 2 spacing-washers or sleeves 11 may, if desired, as shown in Fig. 4, be mounted on said bolts to space apart the angle-irons forming said hub. Said swivel may, if desired, embody any suitable form of ball-bearing—for example, as shown in Fig. 3—the construction of which is obvious from the drawing, and is thought to require no further description.

It is obvious that the construction of our invention may be modified or altered in other minor details without departing from its spirit and scope. We do not, therefore, desire our patent to be limited to the exact details of construction as illustrated or described.

In operation said hook 9 is attached to any suitable additional hauling means or source of power. (Not shown.) The hooks are then drawn apart at their lower ends and adjusted around the load and preferably engaged therewith. The hauling means is then started, causing the hooks to grapple the load. If the load be a log being drawn endwise along the ground, the arrangement of hooks as shown will usually prevent any obstacle from contacting with the forward end of the log, but will either push them from the path of the log or divert the log past them. Such arrangement will also usually serve to prevent the forward end of the log digging into the ground. By increasing the number of flanges of the hub any suitable greater number of said hooks may be provided, or, if desired, a less number may be used.

Having described our invention, what we claim, and desire to secure by Letters Patent, is—

1. The combination of a hub having flanges formed on the outer side thereof, hooks pivoted to said flanges, cables secured at their ends to said hooks intermediate of the ends of said hooks and directed through a central passage in said hub, and a swivel hauling device secured to the opposite ends of said cables.

2. The combination of a hub, a plural number of hooks pivotally connected to the outer side of said hub, antifriction-rollers mounted on said hub, flexible means secured to said hooks below said hub and extending loosely through said hub, and hauling means secured to said flexible means above said hub.

In testimony whereof we hereunto affix our signatures in presence of two witnesses.

ROBERT E. WHITE.
HARRY HALL.

Witnesses:
JAMES T. WATSON,
W. H. SMALLWOOD.